United States Patent
Mahyar et al.

(10) Patent No.: US 10,726,348 B2
(45) Date of Patent: Jul. 28, 2020

(54) PROBABILISTIC HTTP REQUEST ROUTING

(71) Applicant: Verizon Digital Media Services Inc., Dulles, VA (US)

(72) Inventors: Hooman Mahyar, Los Angeles, CA (US); Amir Reza Khakpour, Santa Monica, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 877 days.

(21) Appl. No.: 15/271,063

(22) Filed: Sep. 20, 2016

(65) Prior Publication Data

US 2017/0264531 A1    Sep. 14, 2017

Related U.S. Application Data

(63) Continuation-in-part of application No. 15/065,586, filed on Mar. 9, 2016, now Pat. No. 10,474,965.

(51) Int. Cl.

| | |
|---|---|
| *G06F 9/50* | (2006.01) |
| *G06N 99/00* | (2019.01) |
| *G06F 21/62* | (2013.01) |
| *G06N 20/00* | (2019.01) |
| *G06N 7/00* | (2006.01) |
| *H04L 29/08* | (2006.01) |
| *G06N 5/00* | (2006.01) |

(52) U.S. Cl.
CPC ............ *G06N 7/005* (2013.01); *G06N 5/003* (2013.01); *H04L 67/02* (2013.01); *H04L 67/1023* (2013.01); *H04L 67/1036* (2013.01); *H04L 67/327* (2013.01); *G06N 20/00* (2019.01)

(58) Field of Classification Search
CPC ........ G06N 7/005; G06N 20/00; G06N 5/003; H04L 67/02; H04L 67/1023; H04L 67/1036; H04L 67/327
USPC ................................................ 706/1–62; 1/1
See application file for complete search history.

(56) References Cited

U.S. PATENT DOCUMENTS

| | | | | |
|---|---|---|---|---|
| 9,684,774 | B2 * | 6/2017 | Shaik | H04L 63/0892 |
| 2015/0379426 | A1 * | 12/2015 | Steele | G06N 20/00 |
| | | | | 706/12 |
| 2016/0011908 | A1 * | 1/2016 | Paul | G06F 9/5027 |
| | | | | 718/104 |

(Continued)

*Primary Examiner* — Brandon S Cole
(74) *Attorney, Agent, or Firm* — Ansari Katiraei LLP; Arman Katiraei; Sadiq Ansari (57) ABSTRACT

Some embodiments perform probabilistic request routing in addition to or instead of deterministic request routing. The probabilistic request routing is based on probabilistic models that predict the type of content being requested based on commonality in elements between different requests directed to the same type. The probabilistic models accurately route requests that have not been previously encountered and accurately route requests for content whose type is not previously known. The requests are routed across different subsets of servers that are optimized or configured for the predicted type. The probabilistic models can be defined using a decision tree. Machine learning generates and maintains the decision tree. Accuracy predicted by the different branches of the tree is updated through tracking the type of content passed in response to different routed requests. The tree structure is modified based on timestamps associated with the tree elements and based on newly encountered request elements.

15 Claims, 10 Drawing Sheets

(56) References Cited

U.S. PATENT DOCUMENTS

2016/0330180 A1* 11/2016 Egorov .............. G06F 21/6227

* cited by examiner

PROBABILISTIC HTTP REQUEST ROUTING

CLAIM OF BENEFIT TO RELATED APPLICATIONS

This application is a continuation-in-part of U.S. nonprovisional application Ser. No. 15/065,586, entitled "Methods and Systems for Advanced Content Cacheability Determination", filed Mar. 9, 2016. The contents of application Ser. No. 15/065,586 are hereby incorporated by reference.

BACKGROUND ART

Distributed platforms, such as content delivery networks (CDNs), operate a distributed set of servers. Through the distributed set of servers, the distributed platform provides a distributed delivery of content and services to different requesting users over digital networks, such as the Internet.

The distributed platform deploys different sets of caching servers to different points-of-presence (PoPs). The location of each PoP can be selected to be geographically proximate to a different large population of content requesting and consuming users. To optimize the delivery of the content and services, the distributed platform routes user requests to the caching servers or PoP that are closest to the requesting users. The caching servers are then able to respond to the requests by serving the cached copies of the content from memory without having to retrieve the content again from the more distant origin servers.

The request distribution across the caching servers of a PoP is controlled by one or more load balancers or request directors operating in the PoP. The request directors perform an intelligent request distribution across the caching servers in order to further optimize caching server performance.

The intelligent request distribution involves the request directors routing requests for the same content to the same caching server or subset of caching servers of the PoP. In doing so, each caching server caches and delivers a unique subset of the overall content cached within the PoP. The intelligent request routing reduces the number of caching servers that retrieve content from a content provider's origin server, maximizes cache-hit ratios, and reduces redundant caching of the same content in different caching servers of the same PoP.

The intelligent request distribution also allows for specialized caching server operation. Different subsets of servers within a PoP can be configured or optimized to cache and deliver different subsets of content or types of content more efficiently than others. For instance, requests for large sized content can be distributed across a first subset of caching servers in a PoP and requests for small sized content can be distributed across a second subset of caching server in the PoP. The first subset of caching servers can be configured with different memory or cache resources and different caching and delivery operations than the second subset of caching servers so that the server performance is optimized for the particular size of content handled by that server.

In addition to or instead of content size, requests can be differentiated on the basis of cacheable or uncacheable content types, prioritized and unprioritized content types, dynamic and static content types, streaming and non-streaming content types, and supplemental (e.g., advertisement) or primary content types as some examples. These are some exemplary types with which requests can be differentiated. The request directors can differentiate requests and types based on any criteria.

For each differentiated type, a different subset of caching servers can be optimized or configured to respond to requests for that type more efficiently than other types. There is a performance penalty if a request is differentiated to an incorrect type and routed to a server that is optimized for a content type that is different than the content type for the content of the request. Accordingly, optimal content delivery performance is realized from distributing requests for different content types to the server or subset of servers that are optimized for delivering content of the requested types.

The request directors rely on deterministic methods to track requests or content directed to the different types. The deterministic methods however require prior knowledge of a request or content specified in the request in order to properly route the request to a server or across a subset of servers optimized for the request, and more specifically, the type of content specified in the request. The deterministic methods are formed in response to one or more request directors of a PoP receiving a first request for particular content, arbitrarily routing the first request to a server in a PoP, detecting the type of content that is sent from the server in response to the first request, and associating the content type with the first request or the served content. Thereafter, the next time the request for that same content is received, the request directors can properly route the request to a server or across a specific subset of servers in the PoP that are optimized for that content type. For instance, the request directors can maintain two different hash tables when the request differentiation is based on two different types. When a request is received at a particular request director, the particular request director can hash the request Uniform Resource Locator (URL) and query the different hash tables to determine if there is an existing hash for the URL in any table. If there is no hash in either table, then the request is the first such request received at the PoP for the URL requested content and the particular request director will guess as to the request type and arbitrarily distribute the request without knowing which server is optimized for the type of content associated with that request.

The inability to correctly route the first instances of different requests can create cache pollution and degrade content delivery performance of individual servers and the distributed platform as a whole. There is therefore a need for non-deterministic methods to route requests in cases where deterministic methods cannot be used or are not primed with the prior information necessary to correctly route the requests. There is a need for such non-deterministic methods to execute with minimal overhead and delay while providing a high level of accuracy.

BRIEF DESCRIPTION OF THE DRAWINGS

A preferred embodiment for probabilistic HyperText Transfer Protocol (HTTP) request routing will now be described, by way of example only, with reference to the accompanying drawings in which.

DETAILED DESCRIPTION

The embodiments provide systems and methods for probabilistic HyperText Transfer Protocol (HTTP) request routing. The systems and methods differentiate and route newly received requests based on a probabilistic modeling of elements from previously received requests, wherein the probabilistic models are derived from commonality found in the Uniform Resource Locators (URLs), header fields, metadata, addressing, and other attributes of the previously received requests and the type of content that is served in response to each of the previously received requests.

Elements from the newly received requests are matched to the probabilistic models in order to predict the type of content being requested in the newly received requests. The type prediction is conducted without performing any lookup of the content being requested. In other words, the type prediction is conducted without a disk, storage, cache, or network lookup. In some embodiments, the probabilistic models are contained entirely within main memory such that the type differentiation and prediction is performed with minimal delay. The type prediction is also conducted without referencing a prior request directed to the same content or URL. In other words, the embodiments use the probabilistic models to differentiate and route requests with URLs that have not been previously encountered and that are unknown.

Some embodiments distribute the newly received requests based on the type prediction. In particular, the servers that respond to the requests are partitioned into different subsets. Each subset is optimized or configured to serve one or more differentiated types of content. The server optimizations or configurations result in servers that are more responsive and efficient in serving a particular type of content than other types of content. For example, a first server may be optimized or configured to serve large content (e.g., larger than one megabyte) more efficiently than small content (e.g., smaller than one megabyte), while a second server may be optimized or configured to serve small content more efficiently than large content. A newly received request that is predicted to be of a particular type based on the probabilistic models is distributed to a server within the subset of servers optimized or configured for distributing that particular type of content.

In some embodiments, the differentiated types of content identified by the probabilistic models are manually configured. The probabilistic models are then formed around these configured types. In other words, different combinations of one or more elements from previously received requests are probabilistically modeled to identify common elements that likely indicate a request directed to a particular type.

Similarly, the request elements with which to form the probabilistic models and determine a differentiated type can be manually configured. For example, the probabilistic models can be formed from a first tier node for the request domain name, a second tier node for the request file extension, and a third tier node for the request user-agent.

In some other embodiments, machine learning automatically and dynamically determines the differentiated types identified by the probabilistic models as well as the request elements on which the differentiated type prediction is based. In some such embodiments, the machine learning selects and adjusts the elements with which to form the probabilistic models as well as adjusts the type that is predicted for a request with a common set of elements.

The probabilistic HTTP request routing is implemented on any machine that controls request distribution across a set of servers. In preferred embodiments, the requests are HTTP formatted requests. However, the methodologies and processes set forth herein are similarly applicable to requests of other formats or requests submitted with other protocols.

In some embodiments, the probabilistic HTTP request routing machine is a load balancer or other request director for the set of servers. The request director implementing probabilistic HTTP request routing can also implement deterministic request routing methods. In such cases, the request director uses the deterministic request routing methods to distribute requests that have been previously encountered while using the probabilistic request routing methods to distribute requests that have not been previously encountered.

In some embodiments, each server of the set of servers that receives a distributed request from a request director is a caching server that includes memory or storage for temporarily storing copies of content distributed by the caching server in response to at least one earlier request. In some embodiments, the set of servers are partitioned to different subsets. Each subset of servers operates with a different resource allocation, a different caching configuration, or according to a different set of operations. These differences optimize each subset of servers for delivery of a different content type. For example, the partitioned subset of servers can include a first subset of servers optimized for large size content delivery, a second subset of servers optimized for small size content delivery, a third subset of servers optimized for dynamic content delivery, a fourth subset of servers optimized for static content delivery, a fifth subset of servers optimized for streaming content delivery, and a sixth subset of servers optimized for delivering content to mobile devices. These are a few examples of different optimized and configured subsets of servers. Additional subsets can be provided for embodiments that probabilistically differentiate requests or content based on other types.

The one or more request directors and the set of servers that receive the requests from the request directors collectively form a point-of-presence (PoP). All newly encountered requests directed to the PoP initially pass to the one or more request directors of the PoP before being distributed across the set of servers according to the probabilistic models and probabilistic routing methodologies set forth herein.

Figure 1:
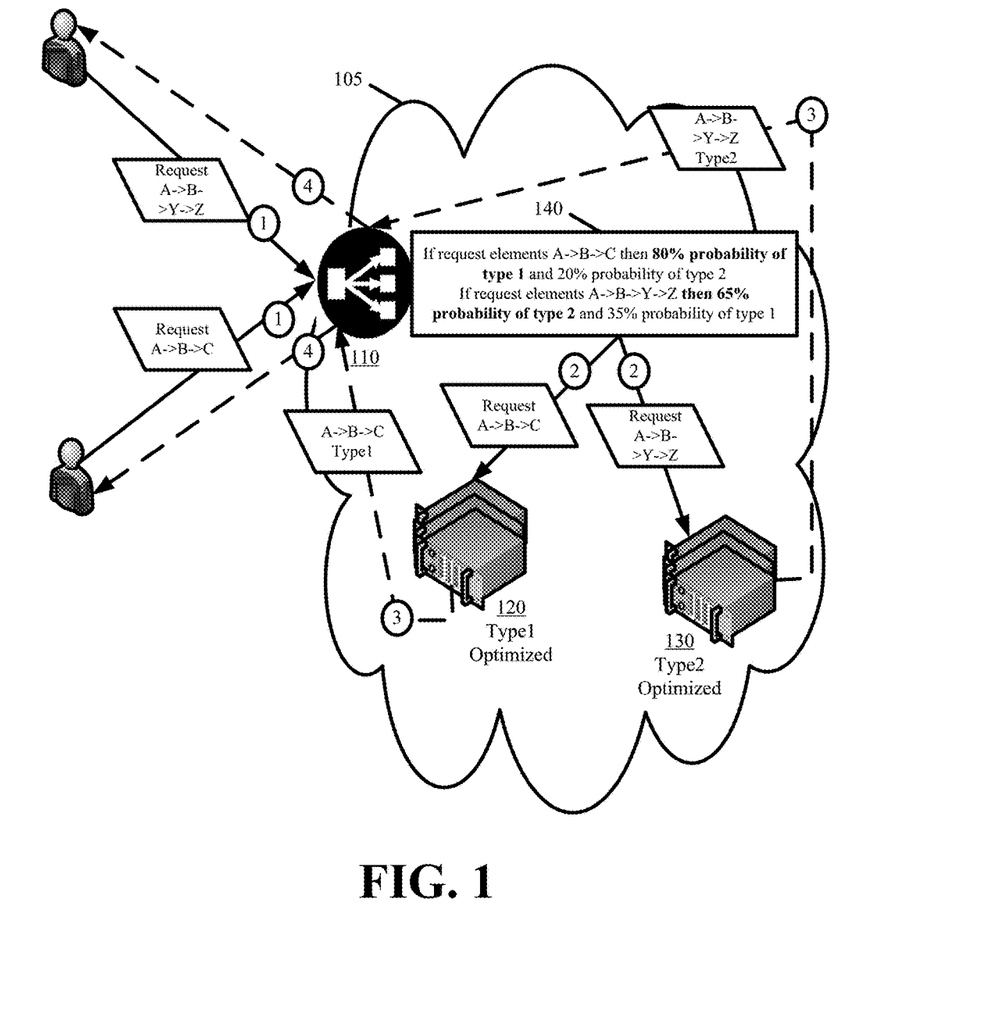
FIG. 1 conceptually illustrates a PoP for implementing probabilistic HTTP request routing in accordance with some embodiments.

FIG. 1 conceptually illustrates a PoP 105 for implementing probabilistic HTTP request routing in accordance with some embodiments. The PoP 105 includes at least one probabilistic HTTP request routing request director 110 and different type optimized subsets of servers 120 and 130.

The request director 110 is configured with one or more probabilistic models 140. The probabilistic models 140 identify different combinations of request elements, a predicted type for requests having any such combination of request elements, and a probability value for the prediction accuracy. Although one director 110 is shown in FIG. 1, multiple directors can operate within the same PoP 105 to control the request distribution for that PoP 105.

The optimized subsets of servers 120 and 130 have been configured for optimized delivery of different types of content. Although two subsets of servers 120 and 130 are shown in FIG. 1, the PoP 105 can include a different optimized subset of servers for each content type differentiated by the probabilistic models 140. Alternatively, the illustrated subsets can be optimized for delivering content to two or more different types differentiated by the probabilistic models 140.

The request director 110 receives user requests that arrive at the PoP 105. The request director 110 controls the distribution of the requests across the different subsets of servers 120 and 130 according to the probabilistic models 140. In particular, the request director 110 matches elements from a received request to elements within the probabilistic models 140 in order to predict the request type. By performing the differentiation through the matching of request elements, the request director 110 avoids looking up, retrieving, or obtaining the content being requested. As a result, the request director 110 does not incur the delays (e.g., disk or network) for looking up, retrieving, or obtaining the requested content when routing the requests. This allows the request director 110 to make extremely fast routing decisions.

The different subsets of servers 120 and 130 then provide an optimized delivery for the content and services requested in the user requests distributed by the request director 110. As mentioned above, the different subsets 120 and 130 provide different content delivery performance for different content types.

The request director 110 continually adjusts its probabilistic models 140 to ensure that the one or more elements differentiating to a particular type are accurate to a specified threshold percentage (e.g., at least accurate fifty percent of the time). A combination of elements that combine for accuracy lower than the threshold percentage can be removed from the probabilistic models 140. In some embodiments, the probabilistic models 140 are generated with a chain of elements that yield up to ninety percent accuracy in predicting the type of content that is requested in requests that have not been previously encountered.

The request director 110 adjusts the probabilistic models 140 by monitoring the type of content that each server of the different subsets of servers 120 and 130 sends in response to requests distributed by that request director 110. In some embodiments, the request director 110 distributes a request to a particular server and the particular server sends the requested content back through the request director 110 to the requesting user. In forwarding the content through the request director 110, the request director 110 can track whether the probabilistic models 140 correctly predicted the type of content and the routing decision based on the prediction was correct. In either case, the director 110 adjusts the probabilistic models 140.

If the probabilistic model prediction is correct and the request was accurately routed, the request director increases the accuracy of the prediction resulting from the one or more elements in the probabilistic model from which the routing decision was based. The request director could also add or remove one or more elements from that model to further increase the accuracy of the model. For instance, machine learning may reveal that one element has little to no impact on the prediction accuracy and that one element is removed from the model. Alternatively, machine learning may reveal that addition of an element to the combination of elements from which the prediction is based can significantly improve the accuracy of the prediction.

Similarly, if the probabilistic model prediction was incorrect and the request was incorrectly routed, the request director updates the probabilistic models. Here, the updating may involve decreasing the accuracy of the prediction resulting from the one or more elements in the probabilistic model from which the routing decision was based. Should the accuracy fall below the specified threshold percentage, the one or more elements identifying the incorrect type can be removed from the probabilistic model. The request director could also reclassify the one or more elements to identify a different type or correlate a different set of elements from the incorrectly routed request to a type.

In some embodiments, the probabilistic models are based on a decision tree. The implementation of the probabilistic models with a decision tree is based on several performance advantages. The decision tree is a compact structure that allows the probabilistic models to be retained within request director memory. The compact structure of the decision tree allows for the probabilistic models to be shared with other request directors operating in the same PoP or different PoPs. By sharing the decision tree across two or more request directors, the distributed request knowledge of the directors can be combined in one decision tree, thereby improving the accuracy of the decision tree and the speed with which the decision tree is adjusted. The decision tree is also a structure that can be quickly traversed in order to predict a request type.

Figure 2:
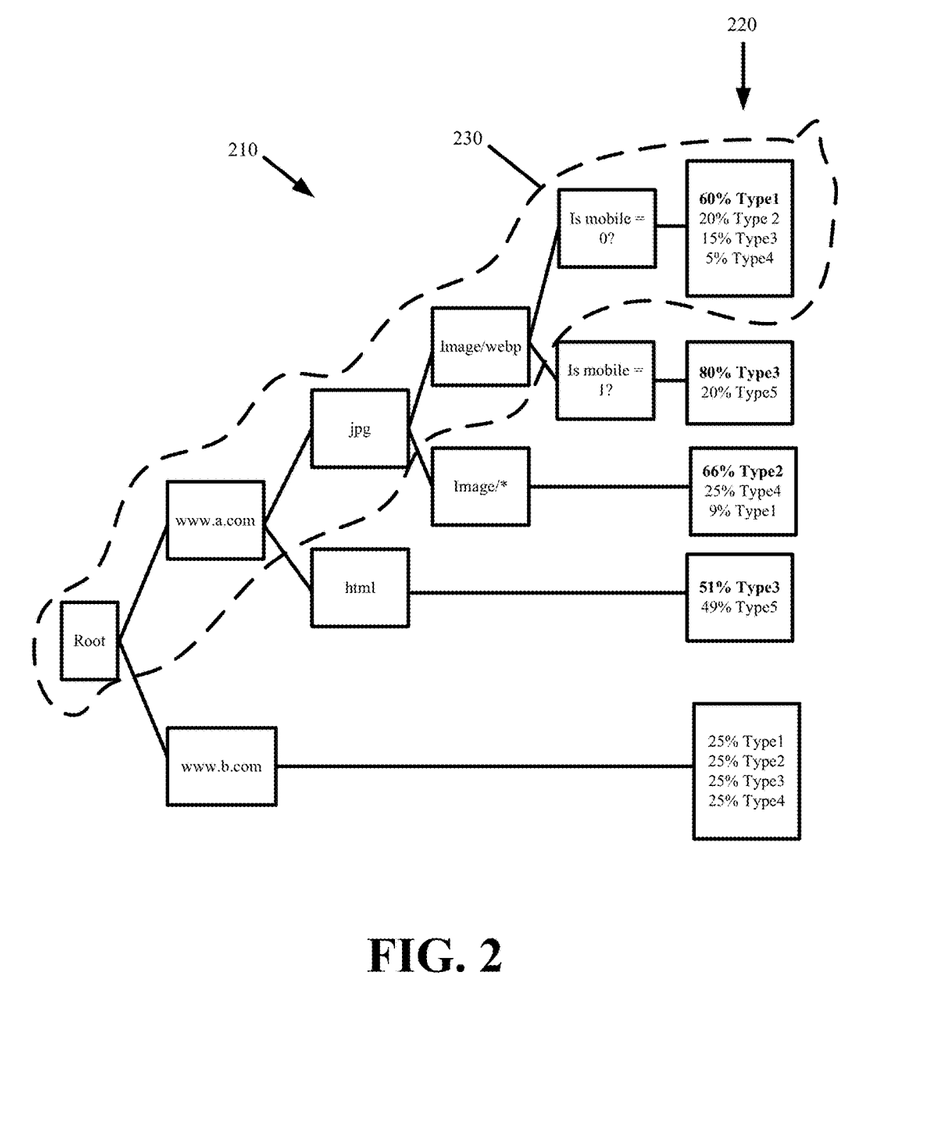
FIG. 2 conceptually illustrates a decision tree forming a probabilistic model in accordance with some embodiments.

FIG. 2 conceptually illustrates a decision tree 210 forming a probabilistic model in accordance with some embodiments. The decision tree 210 is formed from elements of different requests received at the request director. The elements can be extracted from the URL, header, metadata, addressing, or other attributes of the request. For instance, URL domain names, URL paths, URL filenames, URL file extensions, URL query string arguments, the "user agent" header field, the "accept header" field, the "cache-control" header field, the destination port, and the destination Internet Protocol (IP) address can each be used as an element in the decision tree among other elements.

In some embodiments, the decision tree 210 is formed based on a predefined set of request elements. In other words, the request director 210 is configured to monitor certain request elements and build the decision tree 210 based on those elements. In some other embodiments, the request director dynamically determines which elements from the requests will be used to build the decision tree 210 based on the frequency and importance of those elements in predicting different types.

The decision tree 210 has branches that are formed from one or more elements linked together. Each branch of the decision tree 210 ends with a leaf 220 representing at least one type classification. In some embodiments, each leaf 220 specifies the probabilistic accuracy of the branch elements in predicting different types. For example, if the request director differentiates requests based on four different types, the leaf of each decision tree branch will specify the accuracy or percentage with which the elements of the branch result in requests of each of the four types.

The branches can be of different lengths. The different branch lengths depend on the number of matching elements that are needed to accurately predict the request type. Some branches provide a probabilistic model for accurately predicting content type from a single request element, whereas other branches provide probabilistic models for accurately predicting content type from two or more different elements.

Branch 230 of the decision tree 210 is formed as a result of the request director maintaining the decision tree 210 receiving requests for different content with each request containing at least the following elements: (1) domain name "www.a.com", (2) URL parameter "jpg", (3) URL path "image/webp", and (4) a user agent identifying the request as originating from a non-mobile device. 60% of these requests resulted in a first type of content being served, 20% of these requests resulted in a second type of content being served, 15% of these requests resulted in a third type of content being served, and 5% of these requests resulted in a fourth type of content being served. It should be noted that the requests forming branch 230 can contain other elements that direct the requests to different content.

In some embodiments, the decision tree 210 is initially formed based on requests from a prior interval recorded within server access logs. For example, logged requests received in the last five minutes can be used to bootstrap the decision tree 210 or recreate the decision tree 210 after resetting. In some embodiments, the decision tree 210 is initially formed as new requests are received and the content type returned in response to each request is identified. In either case, once an initial set of branches are created, the decision tree 210 is updated based on subsequently received requests and the content type returned in response to those requests. In doing so, the decision tree 210 dynamically adjusts the probabilistic models.

In the case of a new customer or previously unseen request elements, a prediction is made based on existing traversed branches. However, after one or more such requests are received, the decision tree 210 will sprout new branches to incorporate the new customer or previously unseen request elements, thereby increasing the accuracy of the probabilistic model for those requests.

The decision tree 210 accuracy increases as the number of elements from which the tree is modeled increases. The accuracy stems in part from the common usage of request elements in identifying different types of content. For instance, the "image" or "img" element commonly identifies requests for images, wherein images are typically associated with small size content. Conversely, the "app" or "game" element commonly identifies requests for large size content. The decision tree captures the commonality of individual request elements and combines them with the commonality of other request elements in order to increase the accuracy of the prediction. In other words, the decision tree prediction is based on the request type commonality of several elements combined such that even when one element from a particular request incorrectly identifies a corresponding common content type, the prediction will still be accurate based on other request elements that correctly identify their corresponding common content types.

Figure 3:
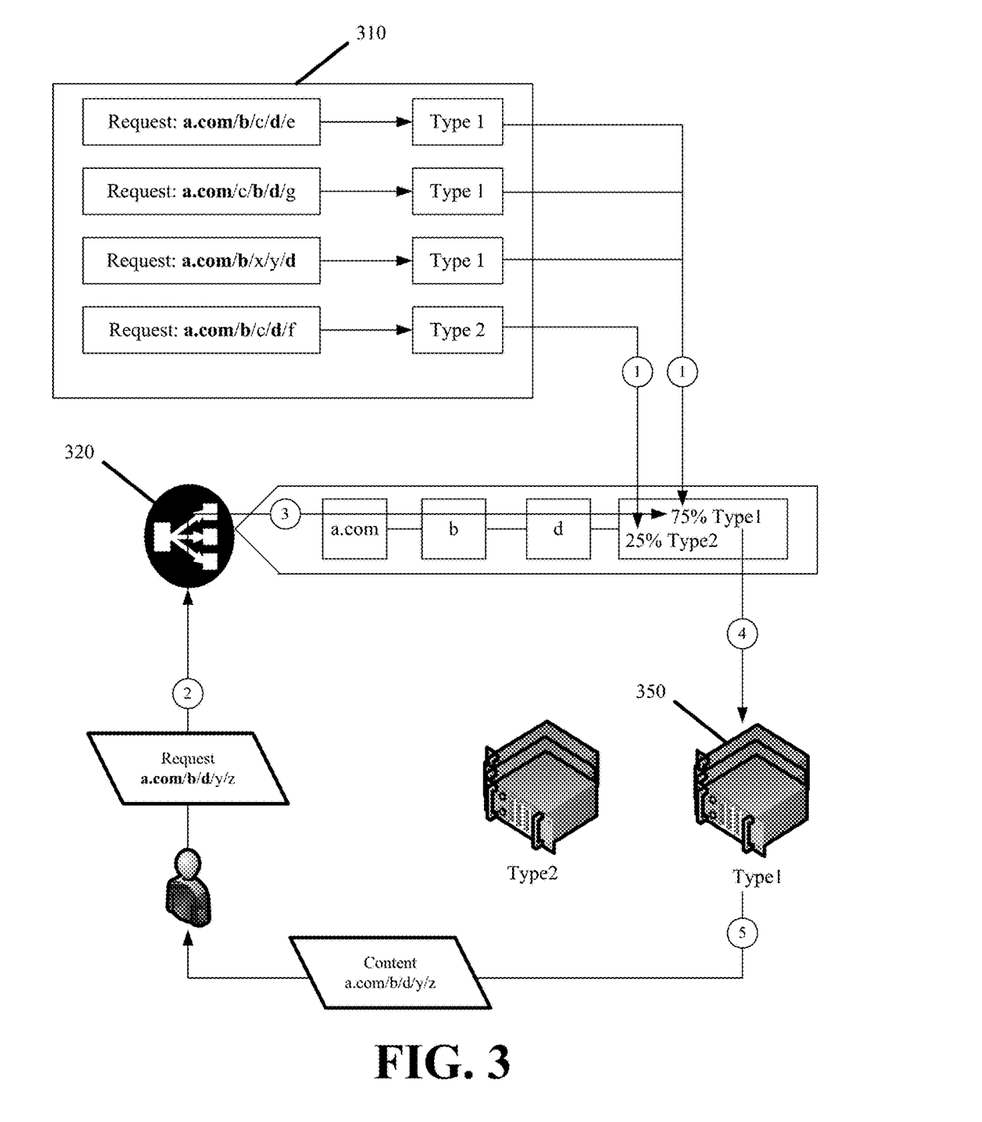
FIG. 3 conceptually illustrates probabilistic request routing according to the decision tree of some embodiments.

FIG. 3 conceptually illustrates probabilistic request routing according to the decision tree of some embodiments. This figure depicts four earlier received requests 310 that are directed to different content, but contain three similar elements. Three of the four requests 310 result in a first type of content being served and the fourth request results in a second type of content being served.

Based on this prior information set, the request director 320 forms a branch 330 in a decision tree. The branch 330 includes the three common elements found within each of the four requests. The branch 330 also includes a leaf node providing type probability for requests containing the three common elements as determined from the previous four requests 310.

FIG. 3 also illustrates the request director 320 receiving a request 340 for new content that is different than any of the content requested by the previous four received requests 310. Request 340 is formed from five elements. Three of the five elements are the elements from the requests 310 that formed the branch 330 in the decision tree. Accordingly, in order to predict the type of content specified in request 340, the request director 320 traverses the probabilistic model defined by branch 330 using the three common elements. The request director predicts the request as being directed to the type having the highest accuracy or percentage at the leaf of the branch 330. In this figure, the probabilistic model predicts that the new request 340 has a 75% probability of being directed to the first type. The request director 320 routes the new request 340 to a first subset of servers 350 that are optimized to serve content of the first type as a result of the probabilistic model prediction. The requested content is then served from the first subset of servers 350 to the request originator. Although not illustrated in FIG. 3, the content served from the first subset of servers 350 may first pass through the request director 320 before arriving at the request originator.

Figure 4:
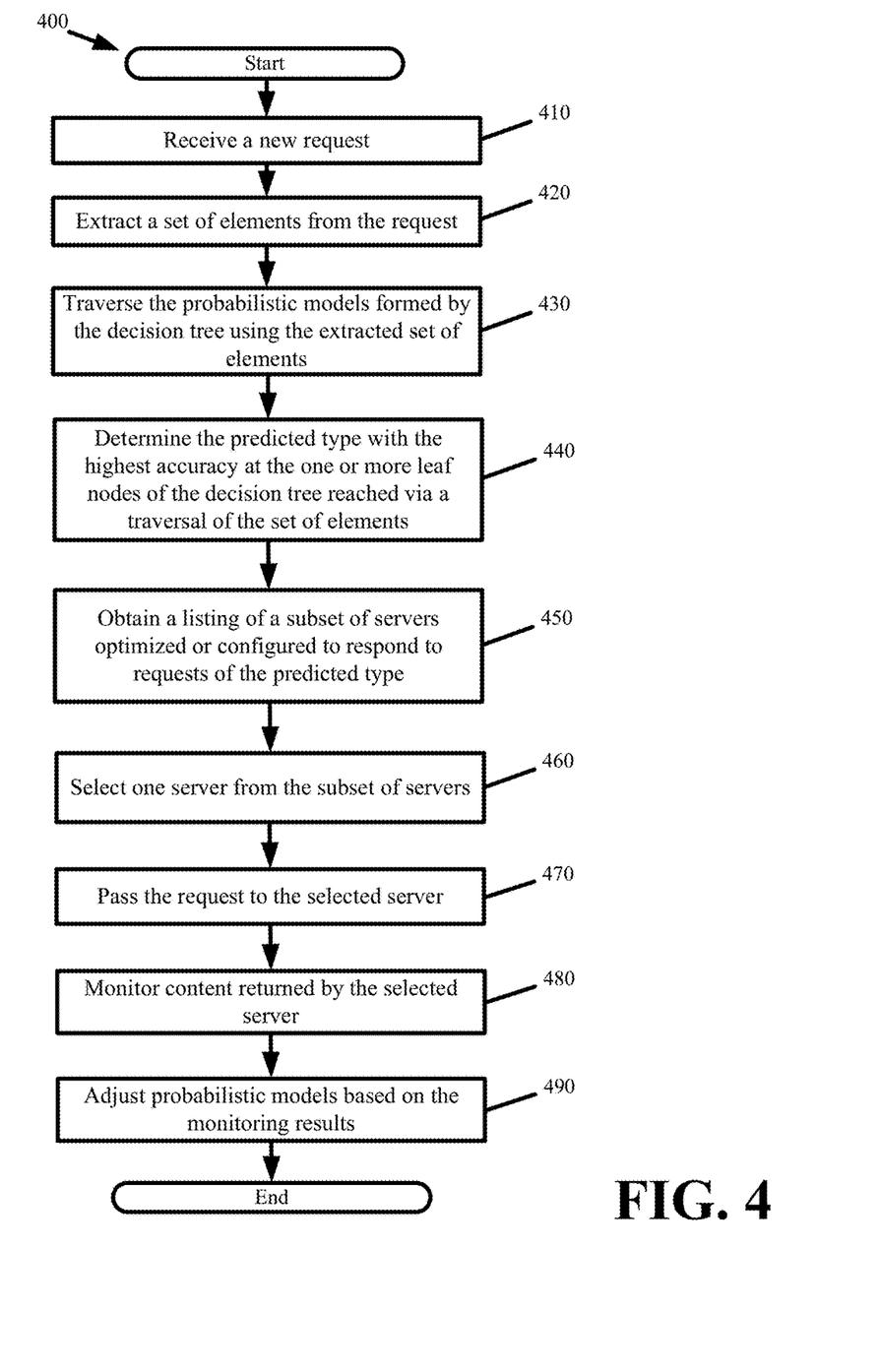
FIG. 4 presents a process detailing the probabilistic request routing of some embodiments.

FIG. 4 presents a process 400 detailing the probabilistic request routing of some embodiments. The process 400 is performed by a request director. The process 400 commences by receiving (at 410) a new request at the request director.

The process extracts (at 420) a set of elements from the request. The set of elements are elements from the request URL, header, or body.

The process traverses (at 430) the probabilistic models formed by the decision tree using the extracted set of elements. The process probabilistically determines (at 440) the request type based on the type with the highest accuracy at the one or more leaf nodes of the decision tree reached via a traversal of the set of elements.

Next, the process obtains (at 450) a listing of a subset of servers that are optimized or configured to respond to requests of the type predicted by the probabilistic model. The process then selects (at 460) one server from the subset of servers. The selection can be based on a persistent or non-persistent distribution of requests across the subset of servers. For instance, the selection can be based on a round-robin distribution across the subset of servers. Alternatively, the request URL can be hashed in order to persistently select one server from the subset of servers. The process passes (at 470) the request to the selected server.

The process monitors (at 480) the content that the selected server returns in response to the request. The process then adjusts (at 490) the probabilistic models based on the monitoring results.

Adjusting the probabilistic models involves updating the accuracy with which a branch implicated by a particular request differentiates the different types based on the monitoring of the content type sent in response to the particular request. Adjusting the probabilistic models further involves adding elements to new or existing decision tree branches and pruning existing elements or branches from the decision tree.

The accuracy of each branch increases with each new request that includes the same element at each layer of the branch and that results in the predicted type of content at the branch leaf being served. The accuracy of each branch decreases with each new request that includes the same element at each layer of the branch and that results in a different type of content other than the predicted type at the branch leaf being served.

It should be noted that a single request could affect the probabilistic models of two distinct decision tree branches. The single request may specify elements that traverse two different branches. More specifically, different combinations of elements from the single request traverse two different branches. In such cases, the type prediction for the request will be based on the leaf node with the highest prediction accuracy. However, once the requested content is served, the identified type can be used to adjust the probabilistic models of the different implicated branches.

Figure 5:
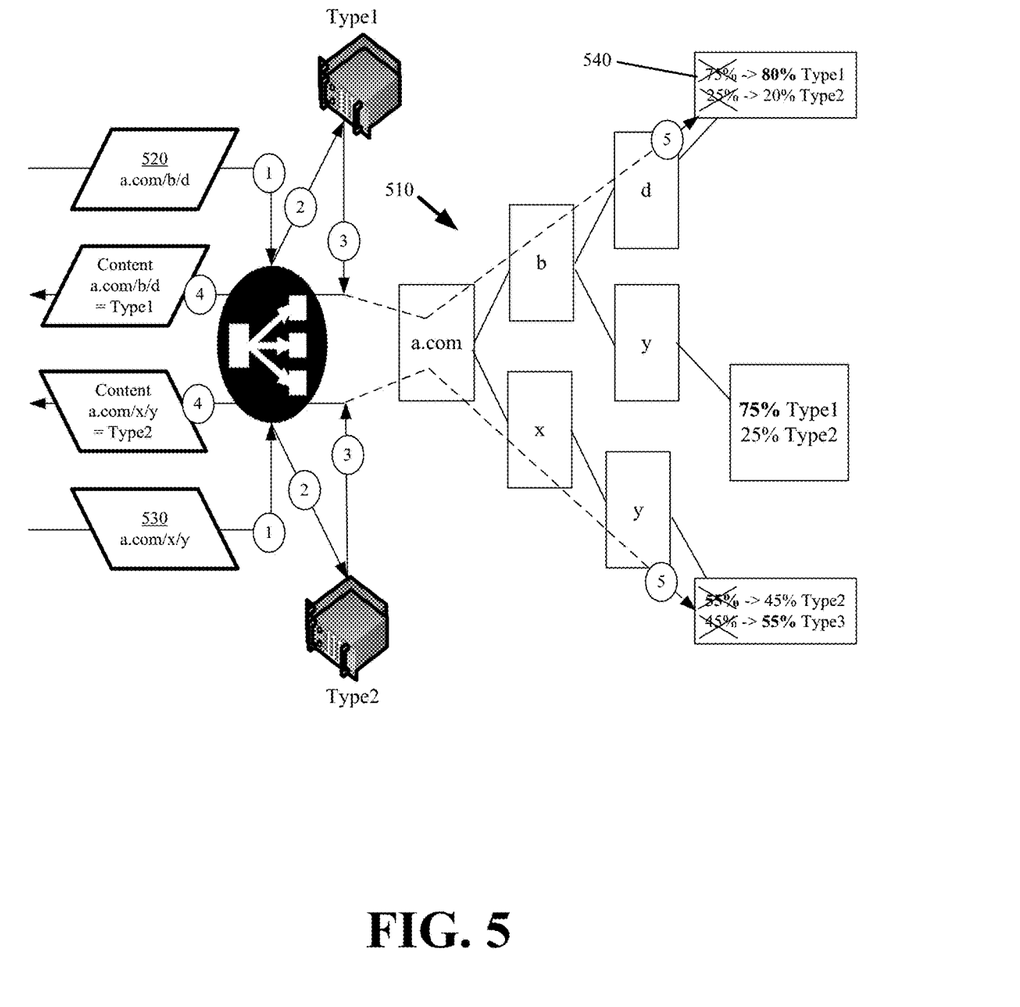
FIG. 5 illustrates adjusting the accuracy of the probabilistic models in accordance with some embodiments.

FIG. 5 illustrates adjusting the accuracy of the probabilistic models in accordance with some embodiments. The probabilistic models are embodied in the depicted decision tree 510. The figure illustrates how the probabilistic models are adjusted in response to two different new requests 520 and 530.

The first new request 520 traverses a first branch of the decision tree and results in a predicted first type of content being served. Accordingly, the accuracy of the first branch in predicting the first type of content is increased at 540.

The second new request 530 traverses a second branch of the decision tree and results in a second type of content being served instead of a third type that is predicted by the second branch. Accordingly, the accuracy of the second branch in predicting the third type is decreased. The adjustment to the second branch changes the prediction of the second branch. In particular, the adjustment lowers the accuracy of the third type prediction and increases the accuracy of the second type prediction. Consequently, the third type prediction is now less than the accuracy of a second type prediction. The probabilistic model provided by the second branch now predicts subsequent requests traversing the second branch to be of the second type rather than the third type.

Modifying the probabilistic models can also include appending one or more elements to the decision tree to create a new branch when the elements of a new request do not traverse any of the existing branches. The request director may provide a type for the newly created branch. The request director adjusts the type if needed based on the content served after routing of the request to a server.

Existing branches can also be forked to create new sub-branches when doing so improves the accuracy of the probabilistic models. In other words, the decision tree can be extended in order to define one or more branches more granularly.

Inversely, the request director may consolidate different existing sub-branches into a single branch when there is sufficient commonality in terms of accuracy and elements between the branches or when a regular expression can represent two or more elements at the same or different decision tree tiers. In some embodiments, consolidation may be the result of removing elements that have no bearing on the accuracy of the probabilistic model. For example, the decision tree can include first tier elements, second tier elements, and third tier elements. In monitoring the requests and returned content, the request director may identify that the second tier elements have minimal or no effect on the accuracy of the routing decision. Accordingly, the decision tree consolidates the decision tree branches by removing the second tier elements and linking the third tier elements directly off the first tier elements.

Some embodiments provide manual overrides by which an administrator can adjust the decision tree or the probabilistic models. In some such embodiments, the administrator can modify the computed content type probabilities at a leaf node of the decision tree. In doing so, the administrator can override the content type prediction at the leaf node. In some other embodiments, the administrator can create or modify branches of the decision tree. The administrator may do so based on knowledge that an added or substituted request element would improve the content type prediction of a branch. For example, the administrator may know that a seemingly arbitrary element used in requests of a particular customer provides a high degree of accuracy in predicting a particular content type. Accordingly, the administrator creates or modifies a branch to include the seemingly arbitrary element and to predict the particular content type.

Maintaining the decision tree size is important for keeping the probabilistic models in memory and also for performance reasons. Faster routing decisions can be made when there are fewer traversals to be made. Accordingly, pruning is another adjustment that is made to the probabilistic models in some embodiments.

Pruning is periodically performed to maintain the size and real-time relevance of the probabilistic models. Pruning can be performed in response to the size of the decision tree surpassing a threshold size, wherein the threshold size can be defined in terms of a number of elements or branches, or in terms of a size in memory. Additionally or alternatively, pruning can be performed at different time intervals. Pruning removes those elements or branches that have not been traversed for some amount of time, thereby removing the obsolete or stale probabilistic models.

Figure 6:
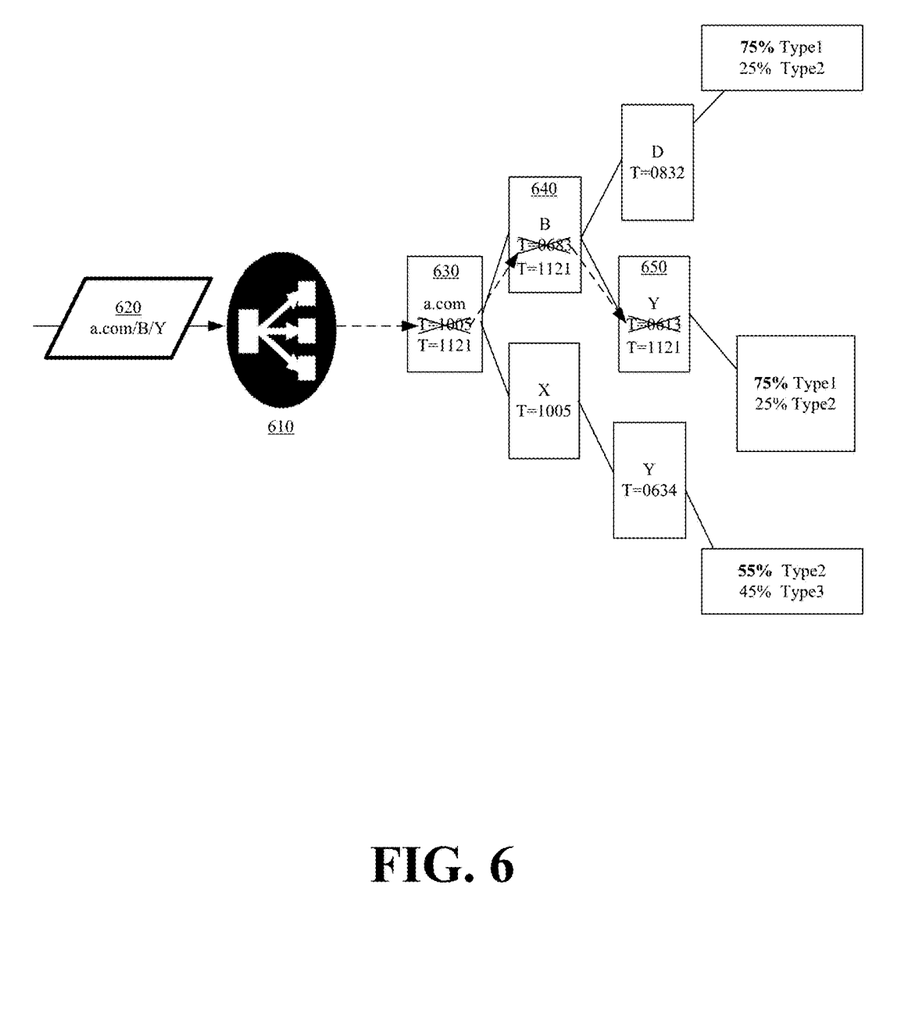
FIGS. 6 and 7 conceptually illustrate pruning in accordance with some embodiments.
Figure 7:
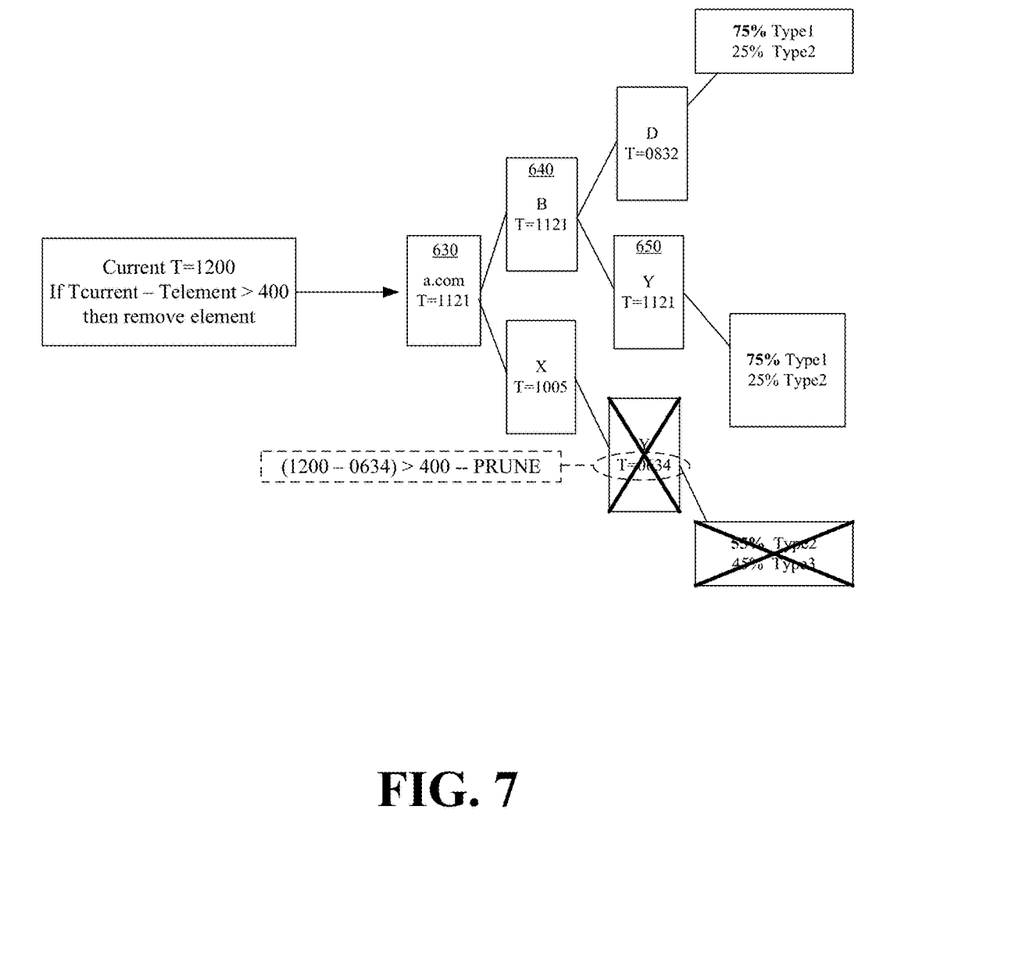

FIGS. 6 and 7 conceptually illustrate pruning in accordance with some embodiments. In these figures, the decision tree associates a timestamp with each element or branch of the decision tree and performs pruning based on the timestamps.

FIG. 6 illustrates resetting the timestamps of a set of elements with a current timestamp as a result of a received request traversing the set of elements. In particular, the figure illustrates the request director 610 receiving a request 620 that results in traversal of elements 630, 640, and 650 about a particular decision tree branch. The request director 610 resets the timestamp for each element 630, 640, and 650 about the traversed particular decision tree branch. The updated timestamps indicate that the probabilistic model represented by the branch is relevant and should continue to be used in predicting request types.

FIG. 7 illustrates pruning elements with old timestamps from the decision tree in accordance with some embodiments. During the pruning pass of FIG. 7, the request director compares a current timestamp with the timestamps of the elements or branches of the decision tree. If the difference between the current timestamp (i.e., 1200) and an element timestamp is more than a threshold amount (i.e., >400), the corresponding element is removed from the decision tree. In this figure, element 710 has a timestamp of 634 which differs by more than 400 from the current timestamp. Accordingly, element 710 is removed from the decision tree.

Thus far the implementation of the probabilistic models has been described with reference to a decision tree. Some other embodiments provide different implementations for the probabilistic models. For example, support vector machines or logistic regression can be used instead of a decision tree in order to generate the probabilistic models. In all such implementations, machine learning is used to generate and maintain the probabilistic models.

As noted above, the request director can perform probabilistic routing of new requests that have not been previously encountered while performing deterministic routing of new requests that have been previously encountered. In some such embodiments, the request director is configured with the probabilistic models and one or more bloom filters with each bloom filter tracking previous requests for a different differentiated type.

In some embodiments, the bloom filters are periodically cleared (e.g., daily, weekly, etc.). The clearing removes stale entries for tracked content that have not recently been requested. To avoid losing all tracked request information when clearing the stale entries, some embodiments employ a rolling flushed bloom filter implementation. The rolling flushed bloom filter implementation uses a first bloom filter to track requests received during a current interval and a second bloom filter to track previously received during a previous interval. At the end of each interval, the bloom filter tracking requests from the prior interval is cleared and the bloom filters swap roles. For instance, the contents of the first bloom filter are preserved to track requests of the now previous interval and the second bloom filter is flushed to track requests of the new current interval at a first expiration of the interval. The roles are once again swapped at a second expiration of the interval. This implementation retains differentiated type information for a recent set of requests while clearing the differentiated type information for requests that were not received in the current interval or previous interval. It should not be noted that other data structures besides a bloom filter can be used to track the previous requests.

Figure 8:
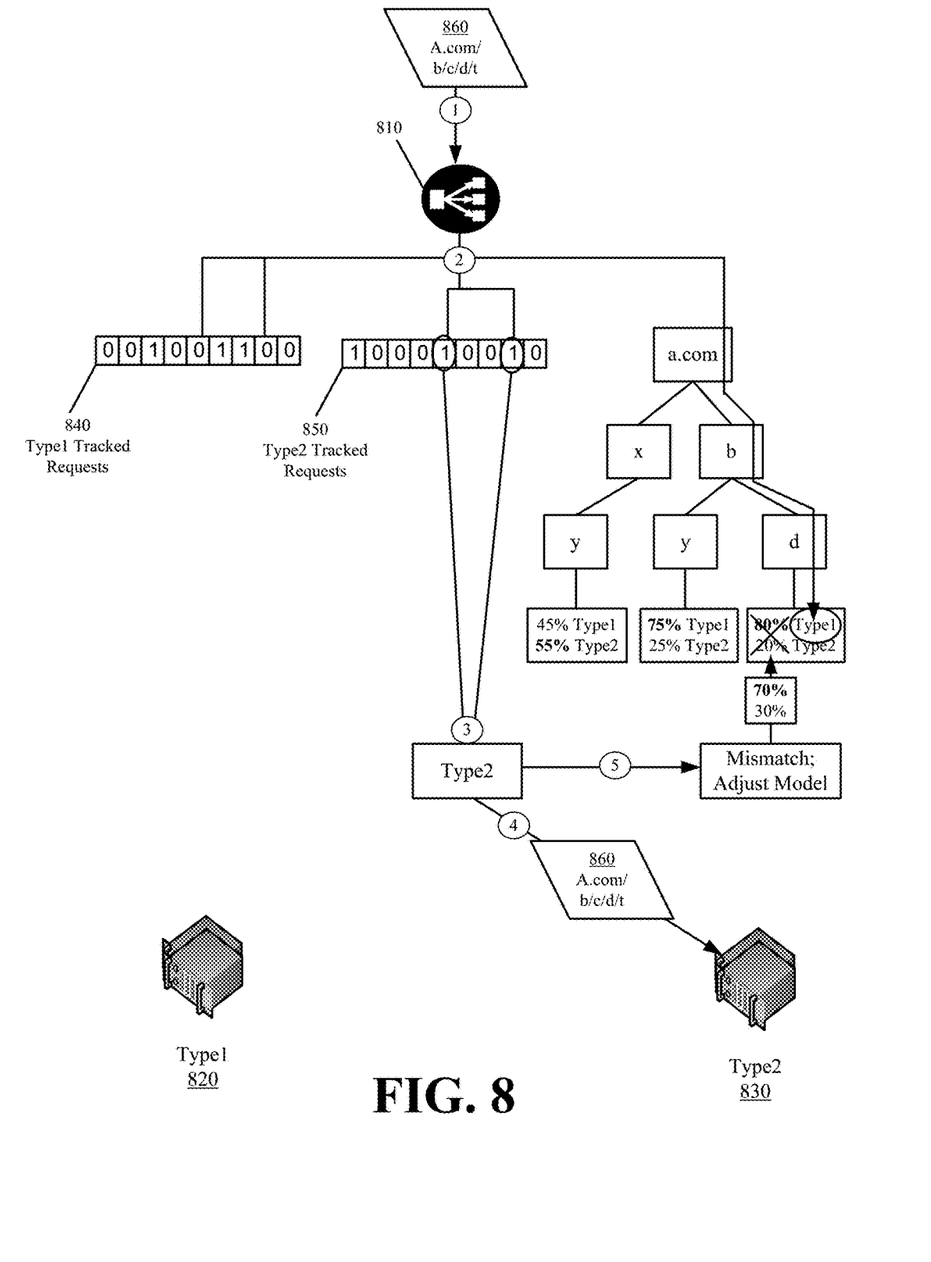
FIGS. 8 and 9 conceptually illustrate the combined probabilistic and deterministic request routing in accordance with some embodiments.
Figure 9:
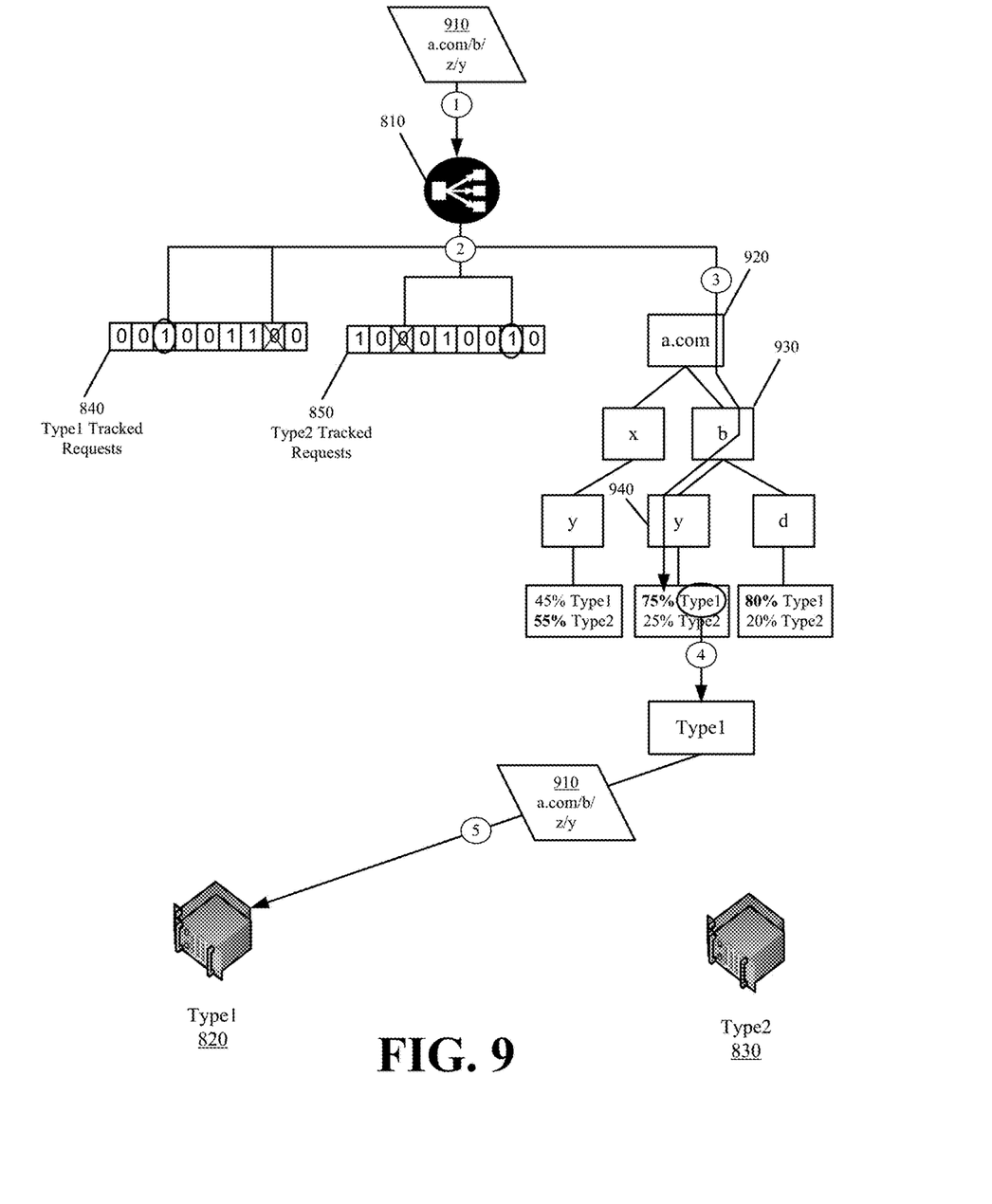

FIGS. 8 and 9 conceptually illustrate the combined probabilistic and deterministic request routing in accordance with some embodiments. These figures illustrate a request director 810 differentiating requests to one of two types and routing requests to one of two subsets of servers 820 and 830 based on the differentiated type, wherein the first subset of servers 820 is optimized or configured to serve content of the first type and the second subset of servers 830 is optimized or configured to serve content of the second type. The request director 810 is configured with two bloom filters 840 and 850. The first bloom filter 840 tracks prior requests that have resulted in the first type of content being served. The second bloom filter 850 tracks prior requests that have resulted in the second type of content being served.

In FIG. 8, the request director 810 receives a first request 860. The request director 810 hashes the first request 860 in order to produce a first set of indices. The first set of indices uniquely identifies the content requested in the first request 820 in each of the bloom filters 840 and 850. The first set of indices is found to be set in the second bloom filter 850 and not in the first bloom filter 840. The first set of indices in the second bloom filter 850 identifies that the same request was previously received and the content sent in response to the previous request was of the second type. Accordingly, the request director 810 routes the first request 860 to one server of the second subset of servers 830 optimized or configured for content of the second type. In this figure, the routing is performed with one hundred percent certainty that the first request 860 is directed to content of the second type because of the prior request for the same content tracked to the second bloom filter 850.

FIG. 8 also illustrates that the probabilistic model incorrectly predicts the type for the first request 860. Since the correct type is known from the second bloom filter 850, the request director 810 also adjusts the accuracy of the probabilistic model.

In FIG. 9, the request director 810 receives a second request 910. The request director 810 hashes the second request 910 in order to produce a second set of indices that uniquely identify the content requested in the second request 910 in each of the bloom filters 840 and 850. Each index of the second set of indices is not set in either the first bloom filter 840 or the second bloom filter 850. This indicates that the request director 810 has not previously received the second request 910 in some prior interval.

Accordingly, the request director 810 uses the probabilistic models to predict the type of the content requested in the second request 910. The request director 810 parses the second request 910 and extracts elements that traverse elements 920, 930, and 940 of the decision tree. This particular branch predicts the second request 910 as being directed to the first content type. The request director 810 routes the second request 910 to one server of the first subset of servers 820 optimized or configured for content of the first type.

In some embodiments, the request director queries the deterministic models at the same time as the probabilistic models. Thus, if the deterministic models cannot deterministically determine the type, the request director can immediately fall back to the probabilistic models.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 10:
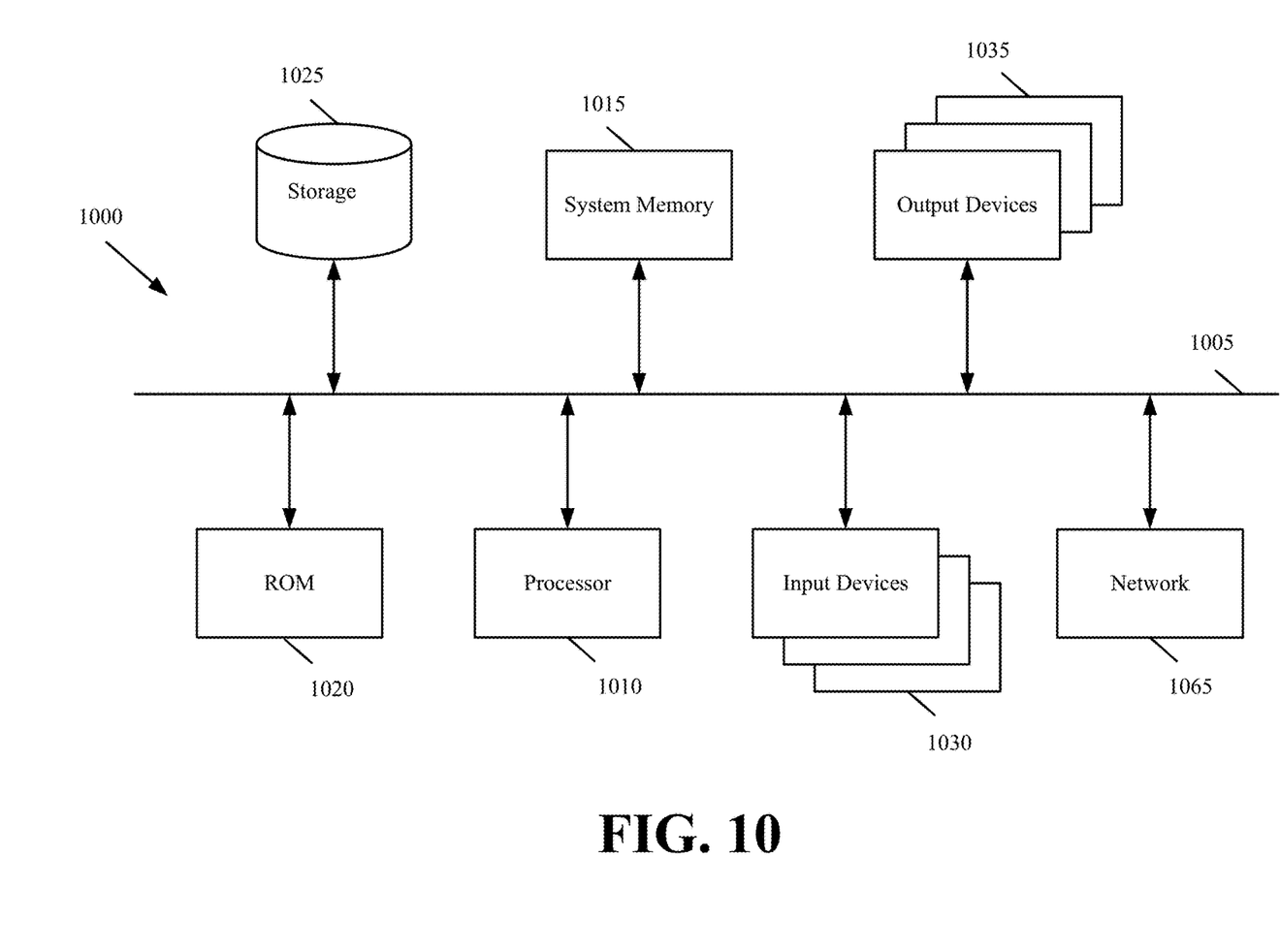
FIG. 10 illustrates a computer system or server with which some embodiments are implemented.

FIG. 10 illustrates a computer system or server with which some embodiments are implemented. Such a computer system includes various types of computer-readable mediums and interfaces for various other types of computer-readable mediums that implement the various methods and machines described above (e.g., request director, caching server, etc.). Computer system 1000 includes a bus 1005, a processor 1010, a system memory 1015, a read-only memory 1020, a permanent storage device 1025, input devices 1030, and output devices 1035.

The bus 1005 collectively represents all system, peripheral, and chipset buses that communicatively connect the numerous internal devices of the computer system 1000. For instance, the bus 1005 communicatively connects the processor 1010 with the read-only memory 1020, the system memory 1015, and the permanent storage device 1025. From these various memory units, the processor 1010 retrieves instructions to execute and data to process in order to execute the processes of the invention. The processor 1010 is a processing device such as a central processing unit, integrated circuit, graphical processing unit, etc.

The read-only-memory (ROM) 1020 stores static data and instructions that are needed by the processor 1010 and other modules of the computer system. The permanent storage device 1025, on the other hand, is a read-and-write memory device. This device is a non-volatile memory unit that stores instructions and data even when the computer system 1000 is off. Some embodiments of the invention use a mass-storage device (such as a magnetic or optical disk and its corresponding disk drive) as the permanent storage device 1025.

Other embodiments use a removable storage device (such as a flash drive) as the permanent storage device Like the permanent storage device 1025, the system memory 1015 is a read-and-write memory device. However, unlike storage device 1025, the system memory is a volatile read-and-write memory, such as random access memory (RAM). The system memory stores some of the instructions and data that the processor needs at runtime. In some embodiments, the processes are stored in the system memory 1015, the permanent storage device 1025, and/or the read-only memory 1020.

The bus 1005 also connects to the input and output devices 1030 and 1035. The input devices enable the user to communicate information and select commands to the computer system. The input devices 1030 include alphanumeric keypads (including physical keyboards and touchscreen keyboards), pointing devices. The input devices 1030 also include audio input devices (e.g., microphones, MIDI musical instruments, etc.). The output devices 1035 display images generated by the computer system. The output devices include printers and display devices, such as cathode ray tubes (CRT) or liquid crystal displays (LCD).

Finally, as shown in FIG. 10, bus 1005 also couples computer 1000 to a network 1065 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 1000 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
   receiving a particular request for distribution across at least a first server and a second server, wherein the first server delivers content of a first type, and the second server delivers content of a second type;
   extracting a plurality of elements from at least a Uniform Resource Locator (URL) of the particular request;
   traversing a particular path in a probabilistic model using the plurality of elements from at least the URL of the particular request, wherein the probabilistic model comprises a plurality of paths with each specific path of the plurality of paths being formed from a common set of elements present in a different set of a plurality of prior requests, and with each specific path of the plurality of paths being associated with at least one probability value derived based on one or more types specified by the set of requests with the common set of elements of that specific path;
   distributing the particular request to the first server in response to predicting that the particular request is directed to content of the first type with a greater accuracy than the second type based on the probability value associated with the particular path in the probabilistic model; and
   distributing the particular request to the second server in response to predicting that the particular request is directed to content of the second type with a greater accuracy than the first type based on the probability value associated with the particular path in the probabilistic model.

2. The method of claim 1 further comprising maintaining the probabilistic model in memory.

3. The method of claim 2, wherein said traversing comprises accessing the probabilistic model in the memory without a disk or network access.

4. The method of claim 1 further comprising monitoring the content sent in response to the particular request.

5. The method of claim 4 further comprising adjusting the probabilistic model based on said monitoring, wherein adjusting the probabilistic model comprises increasing the probability value associated with the particular path in response to a type detected during said monitoring matching with a type from said predicting, and decreasing the probability value associated with the particular path in response to the type detected during said monitoring not matching with a type from said predicting.

6. The method of claim 1 further comprising extracting one or more elements of the plurality of elements from a header field of the particular request.

7. The method of claim 1 further comprising:
   detecting content of the first type being returned in response to a first request of the plurality of prior requests that is directed to first content, and a second request of the plurality of prior requests that is directed to different second content, wherein the first request and the second request each comprise the common set of elements of the particular path;
   detecting content of the second type being returned in response to a third request of the plurality of prior requests that is directed to different third content, wherein the third request comprises the common set of elements of the particular path; and
   generating the probability value associated with the particular path predicting the first type with a first probability based on said detecting content of the first type and said detecting content of the second type.

8. The method of claim 1, wherein the first type represents large size content with file sizes greater than a defined amount, and wherein the second type represents small size content with file sizes less than the defined amount.

9. The method of claim 8, wherein block sizes in storage of the first server are set to store large size content, and wherein block sizes in storage of the second server are set to store small size content.

10. The method of claim 1 further comprising generating the probabilistic model as a decision tree with the plurality of paths and with the particular path defined according to each element from the plurality of elements.

11. The method of claim 10, wherein generating the probabilistic model further comprises linking the probability value as a leaf node of the particular path.

12. The method of claim 1 further comprising:
   tracking a first set of content of the first type distributed by the first server;
   tracking a different second set of content of the second type distributed by the second server;
   receiving a second request with a URL directed to first content; and
   distributing the second request directly to the first server, without referencing the probabilistic model, in response to said tracking the first set of content and the first content matching content in the first set of content.

13. The method of claim 1, wherein content delivery performance of the first server is optimized for content of the first type, and content delivery performance of the second server is optimized for content of the second type.

14. A device comprising:
a non-transitory computer-readable medium storing a set of processor-executable instructions; and
one or more processors configured to execute the set of processor-executable instructions, wherein executing the set of processor-executable instructions causes the one or more processors to:
receive a particular request for distribution across at least a first server and a second server, wherein the first server delivers content of a first type, and the second server delivers content of a second type;
extract a plurality of elements from at least a Uniform Resource Locator (URL) of the particular request;
traverse a particular path in a probabilistic model using the plurality of elements from at least the URL of the particular request, wherein the probabilistic model comprises a plurality of paths with each specific path of the plurality of paths being formed from a common set of elements present in a different set of a plurality of prior requests, and with each specific path of the plurality of paths being associated with at least one probability value derived based on one or more types specified by the set of requests with the common set of elements of that specific path;
distribute the particular request to the first server in response to predicting that the particular request is directed to content of the first type with a greater accuracy than the second type based on the probability value associated with the particular path in the probabilistic model; and
distribute the particular request to the second server in response to predicting that the particular request is directed to content of the second type with a greater accuracy than the first type based on the probability value associated with the particular path in the probabilistic model.

15. A method comprising:
receiving a plurality of prior requests;
tracking a first set of content of a first type distributed by a first server in response to a first set of the plurality of prior requests;
tracking a different second set of content of a second type distributed by a second server in response to a second set of the plurality of prior requests;
receiving a first request directed to first content;
distributing the first request directly to the first server in response to tracking the first set of content and the first content matching content in the first set of content;
receiving a second request directed to second content, wherein the second content is different than content in the first set of content or the second set of content;
extracting a plurality of elements from the second request;
distributing the second request to the first server in response to predicting the second content to be of the first type with a higher probability than the second type based on a greater number of the first set of prior requests than the second set of prior requests comprising the plurality of elements extracted from the second request; and
distributing the second request to the second server in response to predicting the second content to be of the second type with a higher probability than the first type based on a greater number of the second set of prior requests than the first set of prior requests comprising the plurality of elements extracted from the second request.

* * * * *